Dec. 16, 1947. T. B. PRICKETT ET AL 2,432,543
CATALYTIC CONVERTER
Filed April 21, 1942 2 Sheets-Sheet 2
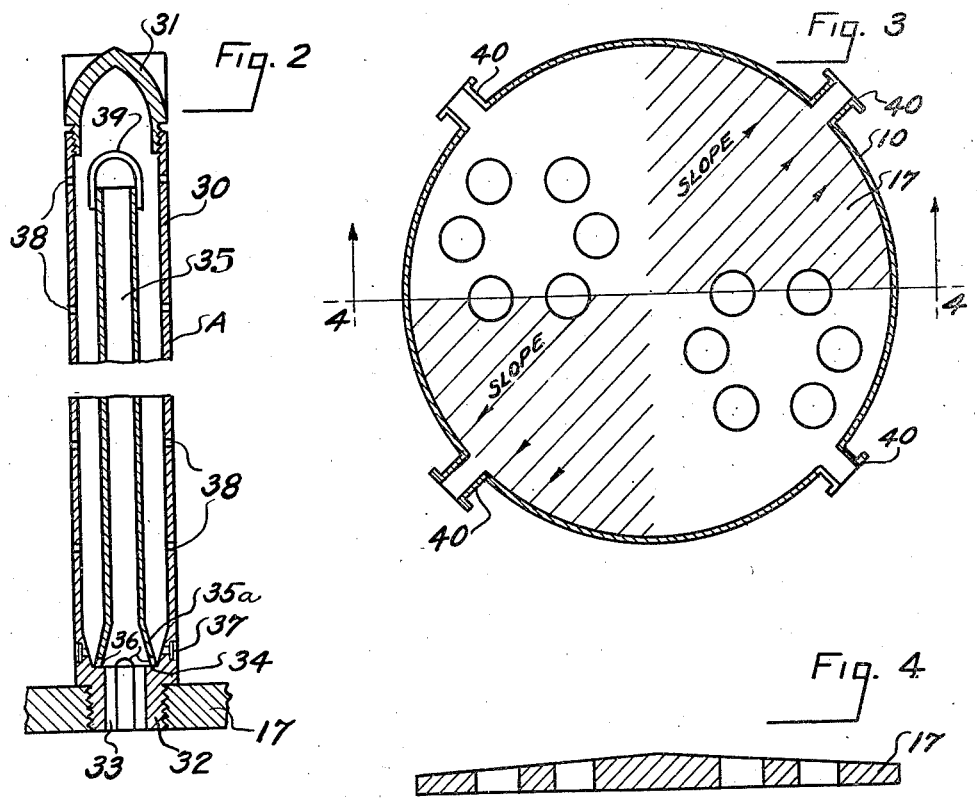
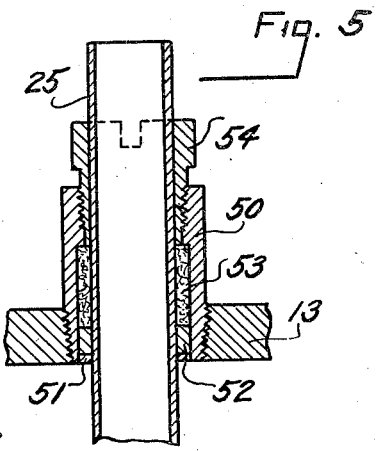
INVENTOR
THOMAS B. PRICKETT
RAYMOND C. LASSIAT
BY
Ira L. Nickerson
ATTORNEY Patented Dec. 16, 1947

2,432,543

UNITED STATES PATENT OFFICE 2,432,543

CATALYTIC CONVERTER

Thomas B. Prickett, Bryn Mawr, and Raymond C. Lassiat, Media, Pa., assignors to Houdry Process Corporation, Wilmington, Del., a corporation of Delaware Application April 21, 1942, Serial No. 439,824

2 Claims. (Cl. 23—288)

This invention relates to chemical reactions involving the use of contact material and particularly is concerned with converter apparatus and its method or manner of operation. In most contacting reactions and especially in transforming and other hydrocarbon reactions the contact material during an on-stream period of operation to obtain the desired product, becomes contaminated with a carbonaceous deposit which must be removed in a regeneration operation to place the material in condition for a later on-stream operation. When the contact material remains in situ during its use in both the on-stream and regeneration operations it is subjected to temperature fluctuations and provision must be made for supplying heat to or removing heat from the material in accordance with the requirements of the particular on-stream reaction which is being carried out. After the on-stream operation, air or other oxygen containing medium is supplied to the material to effect a burning of the deposit and, depending upon the degree of burning which takes place, varying amounts of heat must be removed in order to prevent a temperature rise which might affect the contact material deleteriously. In order properly to control the temperature it is customary to circulate a temperature control fluid at least during the regeneration operation in heat exchange relation with the contact material.

Present converter apparatus used commercially requires that tubes be disposed throughout a bed of the material in order that the fluid may be circulated in indirect heat exchange relation with the material. It is customary also to dispose other tubes within the bed of material for the purpose of distributing reaction fluid to and collecting reaction products from the material. The various tubes are symmetrically positioned within the converter and some or all of the tubes are provided with fins which extend into the mass in order to insure that all portions of the mass are under proper temperature control. Manifolds are required for supplying reaction fluid to the fluid distribution tubes and for removing reaction products from the fluid collector tubes, additionally, heat exchange fluid supply and removal manifolds are required for the heat exchange tubes. The various tubes and partitions or tube sheets forming the manifolds required in a commercial apparatus and the disposition of these elements relative to the reaction chamber present problems in the handling of the contact material as well as problems in controlling the various fluids used in a reaction.

The present invention involves a converter construction generally of the type disclosed in the application of E. J. Houdry, Serial No. 261,728, for Catalytic converters, filed March 14, 1939, and issued May 19, 1942, as Patent No. 2,283,208, and the application of Clarence H. Thayer, Serial No. 350,183, for Catalytic converter, filed August 3, 1940, and issued September 1, 1942, as Patent No. 2,292,430. One object is to provide a converter which is arranged to prevent the accumulation therein of liquid on tarry material. Another object is to improve the distribution of reactants to the contact material. Another object is to provide for relative expansion and contraction of the various converter parts. Another object is to construct a converter in a manner to simplify removal of contact material from the reaction chamber. More specific objects will be apparent from the following detailed description.

In order to illustrate the invention reference may be had to the accompanying drawings wherein concrete embodiments are shown with similar parts indicated by like reference chambers, in which Fig. 1 is a vertical sectional view of a converter with certain parts in elevation. Only a representative number of tubes are shown and these with fins removed for the purpose of clarity.

Fig. 2 is an enlarged sectional view showing details of a reaction fluid tube assembly shown in Fig. 1;

Fig. 3 is a plan view of a particular heat exchange fluid tube sheet shown in Fig. 1 with only a representative number of tube holes indicated;

Fig. 4 is a sectional view on the line 4—4 of Fig. 3;

Fig. 5 is an enlarged view showing a detail of Fig. 1.

Figure 1:
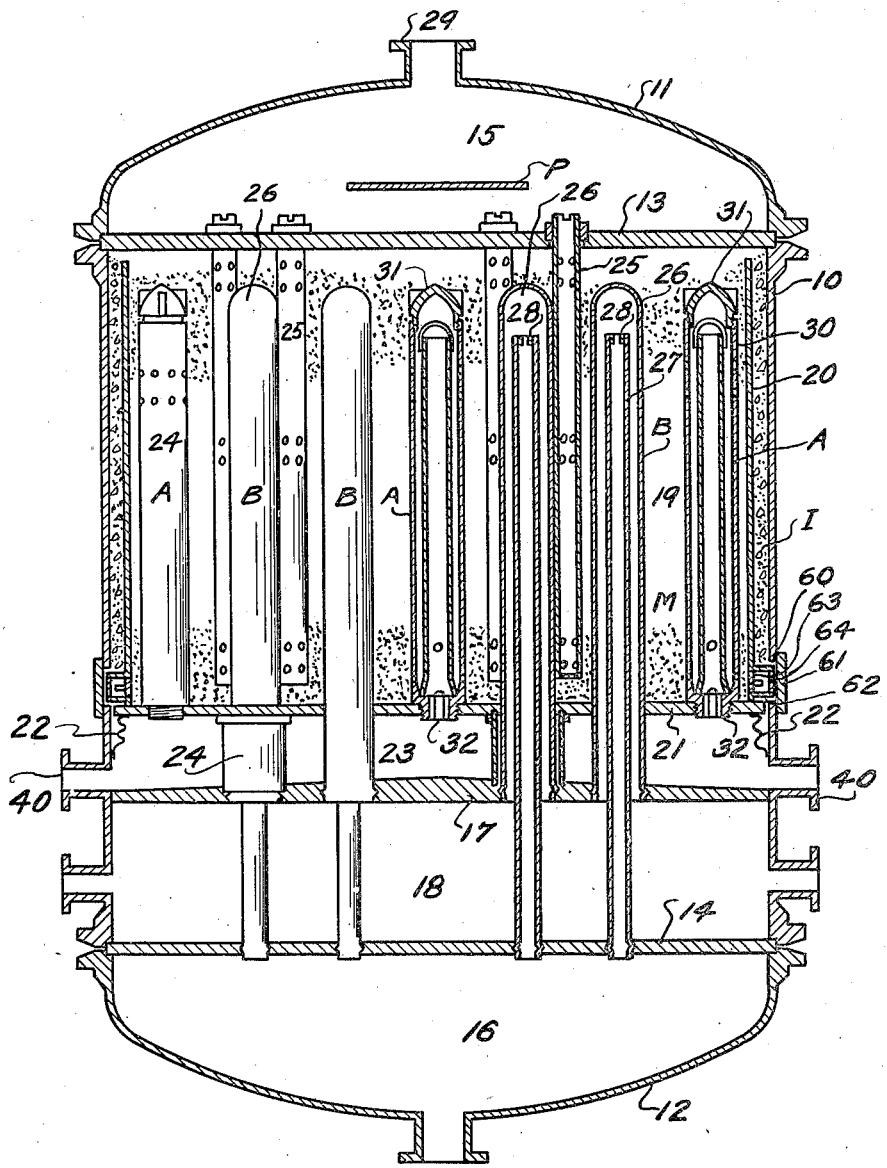

The converter disclosed in Fig. 1 comprises a cylindrical casing generally indicated at 10 which may be provided with an outer covering (not shown) of suitable heat insulating material. The casing has upper and lower closure members 11 and 12, respectively, each of which may be provided with flanges to cooperate with upper and lower flanges of the casing in assembling the converter, while top and bottom transverse walls 13 and 14, respectively, are removably held between the cooperating pairs of flanges forming top and bottom fluid manifolds 15 and 16, respectively. A tube sheet 17 to be described in detail later is disposed above and in spaced relation with the lower transverse wall 14 and rigidly secured as by welding to the interior wall of the converter casing, forming with the lower transverse wall a chamber 18 directly above the lower chamber 16. A reaction chamber 19, which in operation is to be filled with solid contact material M in the form of bits, fragments or molded pieces and utilized to promote, enter into or in any way assist in the desired reaction, is formed by positioning an inner shell 20, which may be of any desired shape, in spaced relation with the casing 10 and filling the space therebetween with suitable heat insulating material I. The bottom of the reaction chamber is formed by welding or otherwise securing a transverse plate 21 to the lower edge of the shell 20 and preferably the plate will have its outer edges slightly spaced from the inside wall of the casing 10 to permit movement of the plate relative to the wall while a corrugated ring 22 is secured to the inner casing wall and to the bottom plate 21 to allow for any strains due to contraction or expansion caused by temperature changes within the reaction chamber. The bottom 21 of the reaction chamber 19 forms with the tube sheet 17 a chamber 23 directly below the reaction chamber and for the purpose of suitably supporting the weight of the contact material on the plate 21 braces in the form of rings 24 may be provided.

The upper partition 13 and the plate or partition 21 are apertured to provide communication between the reaction chamber and the adjacent chambers 15 and 23 forming, in effect, reaction fluid manifolds of these chambers. As indicated in Fig. 1, perforate tubes extend into the contact material for distributing fluid reactants and for the collection of reaction products and comprises sets of tube assemblies generally indicated at A and which will be fully described later which are secured in apertures in the bottom plate 21 and sets of tubes 25 which are secured in apertures in upper partition or plate 13. In the preferred operation one set will be used for distributing the on-stream reactants while the other set will be used for distributing the regeneration reactants. When the reactants are admitted to the upper chamber 15 through the central opening 29 a baffle plate P may be provided for spreading the reactants throughout the chamber and prevent their entering directly tubes located in the central portion of wall 13.

In order to circulate a heat exchange medium such as fused salts, mercury, diphenyl which undergo only small temperature change during use, nested reverse flow tube assemblages B are provided which comprise an outer tube 26 having a closed end positioned adjacent the upper transverse wall 13 and an open end secured in apertures in the tube sheet 17 to be in communication with the chamber 18 and inner tubes 27 which have an open end positioned adjacent the closed end of the outer tube 26 and a lower open end secured in apertures in the lower transverse partition 14 and communicating therethrough with the lower chamber 16. In operation the heat exchange fluid will be circulated in heat exchange relation with the contact material M by admitting it to one of the chambers 16 or 18 for passage upwardly of the outer or the inner tube and removed from the other tube of the assembly into the other chamber. Preferably the fluid will be supplied to the lower chamber 16 for passage first through the inner tubes 27 and in order to equalize the flow through all the tubes, orifice plates 28 are provided. The tubes 25, as indicated, are welded or otherwise secured to outer tubes 26 to provide, in effect, fins for these outer heat exchange tubes, as is clearly described in the application of E. J. Houdry, heretofore mentioned. When a gaseous medium such as steam is used for temperature control the inner tubes 27 will be designated in accordance with the disclosure in application of Clarence H. Thayer and Raymond C. Lassiat, Serial No. 421,916, filed Dec. 6, 1941, and issued September 18, 1945, as Patent No. 2,384,858.

When the converter above described is to be made ready for operation the contact material may be supplied to the reaction chamber 19 from the top of the converter through a conduit arrangement such as that indicated in Patent No. 2,079,630 issued to T. B. Prickett et al. on March 11, 1937.

The reactant fluid conduit assemblages A referred to in connection with Fig. 1 are clearly shown in detail in Fig. 2 and comprise an outer tube 30, which is provided at its upper end with a removable cap 31 and at its lower open end with an exterior screw threaded portion 32 and an inner socket portion 33, having an upper flange or shoulder 34. The inner tube 35 of the assembly preferably has a diverging lower open end 35a which in assembling the unit is adapted to rest or be removably positioned on the upper flange 34 of the outer tube and, as indicated, the inner tube is provided with apertures 36 through which some of the reactants will pass directly to the outer tube and from which they will be distributed through apertures 37 of the outer tube into the contact material at points directly adjacent the top of tube sheet 17. Suitable guide means (not shown) will be provided between tubes 30 and 35 to maintain the inner tubes 35 in fixed position so that its apertures 36 will be positioned between the apertures 37 of the outer tube in order to minimize the velocity effect of the fluid passing directly from the aperture of the inner tube to the apertures of the outer tube. This arrangement of the apertures in the lower portion of the tube assembly insures a sufficient supply of regeneration medium in the lower zone of the reaction chamber to effect a thorough burning of deposit on or adjacent the tube sheet 17. Other apertures 38 are arranged in the outer tube in spaced relation to distribute reactants into the contact material lengthwise of the outer tube. Preferably the apertures near the bottom of the tube assembly are designed to permit about 50 percent of the reactants to enter the contact material at the bottom of the chamber while the apertures above will distribute the remainder from the upper portion of the tube. This method of supplying the fluid tends to decrease the pressure drop between the top and bottom of the annulus defined by the tubes 30 and 32 and insure the optimum distribution of fluids throughout the length of the reaction chamber.

The tube unit just described provides an arrangement which is readily assembled in and removed from the tube sheet 17. In removing the unit the cap 31 is removed from the outer tube and the inner tube is lifted out by means of bail 39, then the outer tube is removed by applying a suitable wrench to the socket portion 33 of the outer tube. The socket insures its removal after long periods of use when it is desired that the contact material be removed from the reaction chamber through the apertures.

Referring again to Fig. 1, means are provided to effect the expeditious removal of all the contact material from the reaction chamber and, for example, may comprise openings 60 provided in the casing outer wall which are normally closed by a cap 61 to give access to rings 62 which communicate through the shell 20 with the reaction chamber at points adjacent the reaction chamber bottom wall 21. The rings 62 are normally sealed by a removable plug 63 and a welded end plate 64. After the tube assemblies A are removed, the contact material may be directed by tools inserted through the openings 60 and rings 62 toward the apertures in the bottom wall of the reaction chamber and if it is necessary because of fusing of the contact material on the tube walls or tube fins, for example, when a tube design or pattern is used which is similar to that shown in the aforementioned application of E. J. Houdry, the contact material may be forced downwardly in the zones between the tubes or fins by suitable tools after the upper end wall 11 and partition 13 have been removed. As the contact material falls from the reaction chamber 19 into the manifold 23 it is then readily removed through nozzles 40 by scraping or by blowing.

Referring to Figs. 3 and 4, the tube sheet 17 heretofore mentioned is shown in detail and is arranged to provide a drain for any liquid which might accumulate in the manifold 23 of Fig. 1. For example, liquid hydrocarbon material when it is admitted to the reaction chamber 19 may cause liquid to collect in the chamber 23. From an inspection of Fig. 4, which view is taken on the central line 4—4 of Fig. 3, it will be seen that the top of the tube sheet slopes gradually from a central point toward its edge. One means of accomplishing this is to arrange the tube sheet in quadrants and, as indicated by the arrowed lines in two of the quadrants of Fig. 3 the slope is toward the inner wall of the casing and, due to the cylindrical shape of the casing, the fluid as it strikes the casing wall will be directed toward the nozzles 40 in each quadrant for removal. The remaining two quadrants of Fig. 3 are shown only with a representative number of holes for the reception of the heat exchange tubes 26, but it is to be understood that holes will be symmetrically arranged in all the quadrants and that all the quadrants will slope toward the nozzles 40.

Referring to Fig. 5 the reactant tubes 25, which extend through the apertures in the upper partition 13 and are secured to the outer heat exchange tubes 26, are provided with an arrangement for permitting expansion or contraction through the tube sheet. To this end a housing 50 is provided for each tube and is secured in apertures in the upper partition 13 providing a space 51 with the outer wall of each tube 25. A retaining ring 52 is secured to the housing 50 at the bottom of the space while a packing 53 is disposed thereon to be suitably compressed to provide a tight fit by means of a gland nut 54.

Although the various means of accomplishing the objects of the invention are shown in detail in the drawings it is to be understood that they are only exemplary and are not to be considered limitative of the invention.

We claim as our invention:

1. In apparatus for carrying out chemical reactions comprising a casing having side and top and bottom end walls, upper and lower transverse partitions extending across the casing providing a reaction chamber therebetween for containing contact material, an upper tube sheet extending across the casing in spaced relation with said lower partition forming a reactant fluid manifold directly below the reaction chamber, a lower tube sheet spaced from the upper tube sheet and bottom end wall forming therewith respectively, upper and lower heat exchange fluid manifolds, heat exchange tube assemblies comprising an outer tube and an inner tube, each outer tube having a closed end positioned within said reaction chamber and an open end secured to said upper tube sheet and communicating therethrough with said upper heat exchange fluid manifold, each inner tube having one open end spaced from the closed end of the outer tube and its other open end secured to said lower tube sheet and communicating therethrough with said lower heat exchange fluid manifold and reactant fluid tube assemblages comprising an outer perforate tube having a removable closed end extending into the contact material and an inner open end tube, the improvement which comprises exterior screw threads on the lower ends of the outer perforate reactant fluid tubes securing the tubes in apertures in the lower partition, and a cooperating inner socket portion having upper shoulders for seating the lower open end of the inner reactant fluid tube, said socket portion being adapted to receive a tool for removing the perforate tube from the apertures to permit contact material to flow into the reactant manifold from the reaction chamber, and openings in the casing side wall in communication with the reactant manifold for removing the contact material from said manifold.

2. In apparatus for carrying out chemical reactions comprising a casing having side and top and bottom end walls, upper and lower transverse partitions extending across the casing providing a reaction chamber therebetween for containing contact material, an upper tube sheet extending across the casing in spaced relation with said lower partition forming a reactant fluid manifold directly below the reaction chamber, a lower tube sheet spaced from the upper tube sheet and bottom end wall forming therewith respectively, upper and lower heat exchange fluid manifolds, heat exchange tube assemblies comprising an outer tube and an inner tube, each outer tube having a closed end positioned within said reaction chamber and an open end secured to said upper tube sheet and communicating therethrough with said upper heat exchange fluid manifold, each inner tube having one open end spaced from the closed end of the outer tube and its other open end secured to said lower tube sheet and communicating therethrough with said lower heat exchange fluid manifold and reactant fluid tube assemblages comprising an outer perforate tube having a removable closed end extending into the contact material and an inner open end tube, the improvement which comprises exterior screw threads on the lower ends of the outer perforate reactant fluid tubes securing the tubes in apertures in the lower partition, and a cooperating inner socket portion having upper shoulders for seating the lower open end of the inner reactant fluid tube, said socket portion being adapted to receive a tool for removing the perforate tube from the apertures to permit contact material to flow into the reactant manifold from the reaction chamber, said upper tube sheet being tapered centrally toward the casing side wall and openings in communication with the reactant manifold for removing the contact material from said manifold.

THOMAS B. PRICKETT.
RAYMOND C. LASSIAT.

REFERENCES CITED

The following references are of record in the file of this patent:

UNITED STATES PATENTS

| Number | Name | Date |
|---|---|---|
| 2,283,208 | Houdry et al. | May 19, 1942 |
| 135,172 | Tiffany | Jan. 21, 1873 |
| 2,185,928 | Simpson et al. | Jan. 2, 1940 |